Patented Sept. 17, 1940

2,215,154

UNITED STATES PATENT OFFICE 2,215,154

EMBALMING FLUID

Hilton Ira Jones, Wilmette, Ill., assignor to National Selected Morticians, Inc., Chicago, Ill., a corporation of the District of Columbia No Drawing. Application February 21, 1939,
Serial No. 257,715

4 Claims. (Cl. 27—21)

This invention relates to an embalming fluid and the method of making the same.

An object of the invention is the provision of a fluid containing as the principal embalming ingredients soluble salts of the metals of the rare earths which will aid in maintaining bodies in a perfect state of preservation.

Another object of the invention is the provision of an embalming fluid containing as the principal ingredients radio active salts of the metals of the rare earths which will aid in maintaining bodies in a perfect state of preservation.

A further object of the invention is the provision of an embalming fluid containing soluble salts of the metals of the rare earths in connection with formalin, alcohol and glycerine.

A still further object of the invention is the provision of an embalming fluid which has as its principal ingredients soluble deliquescent salts of the metals of the rare earths such as the chlorides in connection with radio active substances for aiding in maintaining bodies in a perfect state of preservation.

This invention will be best understood from a consideration of the following detailed description, nevertheless, it is to be understood that the invention is not confined to the disclosure, being susceptible of such changes and modifications as define no material departure from the salient features of the invention as expressed in the appended claims.

In carrying out the process chlorides of the metals of the rare earths are obtained in solid crystalline form from gas mantle manufacturers under the name of "rare earth chlorides" or the chlorides of these metals may be particularly manufactured for the purpose. These chlorides are obtained from monazite sands from which a portion of thorium, meso-thorium and cerium are removed for the preparation of the gas mantles. However, in view of the efficacy of the radio active qualities of thorium and meso-thorium, chlorides of these metals may be added to the residue obtained from the gas mantle manufacturers when it is found that such residue does not contain sufficient quantities of these elements for the purpose.

The chlorides of the metals of the rare earths are not only readily soluble in water and alcohol but these salts are deliquescent. The principal chlorides are cerium, lanthanum, didymium, yttrium, zirconium with definite traces of thorium and meso-thorium.

While the rare earth chlorides are generally obtained as a residue from monazite sands from manufacturers of gas mantles, nevertheless, it will be appreciated where this residue is found deficient in certain of the chlorides an additional quantity of these chlorides will be added in order to give the proper strength for preserving purposes of bodies.

The embalming fluid contains a mixture of the following ingredients and in the following proportions:

| | Parts |
|---|---|
| Formalin | 50 |
| Methanol | 20 |
| Glycerine | 18 |
| Rare earth chlorides | 18 |
| Magnesium sulphate | 3 |
| Water | 12 |

The above ingredients are mixed in the proper proportions named and thoroughly agitated and the solution thus obtained is employed in the usual manner in the process of embalming. The chlorides, as has been stated, are not only soluble in the water employed but are also soluble in the two alcohols, methanol and glycerine.

Due to the fact that the glycerine not only acts as a solvent but also as a lubricant for the solution will more readily penetrate the smaller branches of the arteries when the embalming fluid has been injected into the body in the usual manner. The methanol not only acts as a solvent but in connection with formalin also is effective as an antiseptic.

Certain of the radio active elements of the rare earths are contained in the soluble salts, such as the chlorides of thorium and meso-thorium, and the chlorides are used in the present invention to increase the efficiency of the embalming fluid.

Further the rare earth compounds owe their embalming effects to the fact that they form insoluble compounds with proteins, much as mercuric chloride does and these protein-rare earth complexes absorb large amounts of water from the embalming fluid, with the result that the tissues when embalmed, or at least a few hours after embalming, appear to be dry on the inside instead of very wet. On the other hand the ordinary embalming fluid leaves the tissues in a very moist state. The result then is that the tissues embalmed with the rare earth compounds desiccate very much less rapidly than tissues embalmed with the ordinary fluids now in use.

The function of the magnesium sulphate in the fluid is for the purpose of increasing the drainage and consequently the removal of the blood. Sodium citrate could also be used for the same purpose because both of these compounds will act as a purgative for the removal of blood.

An important function of methanol is to reduce the surface tension of the embalming fluid and thereby increase the ability of the fluid to rapidly penetrate the capillary system.

I claim:

1. An embalming fluid containing chlorides of the metals of the rare earths which will form insoluble compounds with the proteins of the body embalmed.

2. An embalming fluid containing water and deliquescent salts of the metals of the rare earths, the salts forming insoluble compounds with the proteins of the human body, said compounds absorbing water from the fluid.

3. An embalming fluid comprising formalin, alcohol, glycerine, water and chlorides of the metals of the rare earths, said earth chlorides forming insoluble compounds with the proteins of the body embalmed, the compounds absorbing water from the fluid.

4. An embalming fluid consisting of 50 parts of formalin, 20 parts of methanol, 18 parts glycerine, 8 parts of chloride of the metals of the rare earths, 3 parts of magnesium sulphate and 12 parts of water.

HILTON IRA JONES.